United States Patent [19]

Geri et al.

[11] Patent Number: 4,530,971

[45] Date of Patent: Jul. 23, 1985

[54] COVULCANIZABLE COMPOSITIONS FROM FLUOROELASTOMERS BASED ON VINYLIDENE FLUORIDE AND COPOLYMERS TETRAFLUOROETHYLENE-PROPYLENE

[75] Inventors: Sergio Geri; Giovanni Moggi; Carlo Laganà, all of Milan, Italy

[73] Assignee: Montedison S.p.A., Milan, Italy

[21] Appl. No.: 647,749

[22] Filed: Sep. 6, 1984

[30] Foreign Application Priority Data

Sep. 7, 1983 [IT] Italy ............................. 22797 A/83

[51] Int. Cl.³ .................. C08L 27/22; C08L 27/16; C08L 27/18; C08L 27/20
[52] U.S. Cl. ............................. 525/199; 525/194; 525/193
[58] Field of Search ............................. 525/199, 194

[56] References Cited

U.S. PATENT DOCUMENTS

| 3,723,577 | 3/1973 | Stivers | 525/199 |
| 3,769,371 | 10/1973 | Versasian | 525/199 |
| 4,028,431 | 6/1977 | Futami et al. | 525/199 |
| 4,200,568 | 4/1980 | Trautvetter et al. | 525/199 |

FOREIGN PATENT DOCUMENTS 58-021440  2/1983  Japan ............................. 525/199

Primary Examiner—Carman J. Seccuro

[57] ABSTRACT

A fluoroelastomer (A) based on vinylidene fluoride (40–83% by moles), perfluoropropene (15–35%) and tetrafluoroethylene (0%–30%) and a diamino compound (B), are mixed with a copolymer (C) containing tetrafluoroethylene (40%–60% by moles) and propylene (60–40%).

The thus obtained mixture is covulcanizable with systems based on organic peroxides. In particular mixtures are employed, containing: (A)=42–70% by weight, (B)=1–4%, (C)=51–22%, peroxide 0.4–5%, triallylisocianurate 2–4%.

1 Claim, No Drawings

COVULCANIZABLE COMPOSITIONS FROM FLUOROELASTOMERS BASED ON VINYLIDENE FLUORIDE AND COPOLYMERS TETRAFLUOROETHYLENE-PROPYLENE

BACKGROUND OF THE INVENTION

Within the development ambit of the fluorinated elastomers, lastly, well definite needs have been emphasized, i.e:

(1) the chemical stability, also under strict conditions of working temperatures, in the presence of lubricating fluids characterized by a high aggressiveness, such as the oils of SF series, to which amino compounds have been added having a high swelling power towards the fluoroelastomers based on vinylidene fluoride;

(2) a general improvement in the process characteristics of the mixes for the molding of manufactured articles such as oil retainer rings;

(3) possibility of extruding the mixes easily, in order to obtain suitable premolds.

The contemporaneous carrying out of these objects appears to be not achieved yet.

THE PRESENT INVENTION

The Applicant has found that fluorinated elastomers endowed of the above indicated characteristics can be obtained by covulcanizing an elastomeric composition comprising:

(1) a fluoroelastomer (A) based on vinylidene fluoride (40–83% by moles), perfluoropropene (15–35%) and tetrafluoroethylene (0%–30%) in an amount equal to 42%–70% by weight of the total elastomeric composition;

(2) an amino compound (B) consisting of a Schiff base or of a carbamate obtained from a diamino compound, in an amount equal to 1–4% by weight of the total elastomeric composition;

(3) a copolymer (C) of tetrafluoroethylene (40–60% by moles) and propylene (60%–40%), in an amount equal to 22–51% by weight of the total elastomeric composition;

(4) an organic peroxide as vulcanizing agent in an amount equal to 0.4–5% by weight of the whole.

Suitable amino compounds are the ones already known for the vulcanization of the fluoroelastomers: among others, they are described in Rubber World 141 (1960) page 827; for instance we can cite: hexamethylenediamine carbamate, the Schiff base from cinnamic aldehyde and hexamethylenediamine, propanediamine carbamate.

The abovesaid composition also contains preferably a vulcanizing coagent known in the vulcanization with peroxides of the fluoroelastomers, consisting of a polyfunctional compound such as triallylisocyanurate, triallylcyanurate, divinylbenzene, etc. Such a coagent is used in the ratio of 2%–4% by weight on the whole.

In the covulcanization of the abovesaid composition a vulcanizate is deemed to form, having a network system like the one described as "interpenetrating polymer network" (see Enc. of Polymer Sci. and Technol. suppl. volume 1, page 228, 1977).

The network of both polymers, type A by ionic way through amino compound and type C by radicalic way through peroxide, introduces a new structure, although according to a method different from the ones generally described for this class of vulcanizates having an interpenetrating network (see above cited literature).

The elastomeric vulcanizable composition, according to the invention, contains furthermore the usual additives for such elastomers, in particular basic substances such as MgO, PbO, calcium hydroxide and carbon black.

The vulcanization working conditions fall substantially within the ones used for the fluoroelastomers: generally a first heating is carried out in press, followed by a heating of the manufactured article in oven for a longer period of time.

For purposes of example, vulcanizable compositions were prepared, according to the invention, and for purposes of comparison vulcanizable compositions were prepared according to the art, starting from the following elastomers:

Tecnoflon NM: a copolymer vinylidene fluoride (79% by moles) with hexafluoropropylene (21%).

Tecnoflon TN: a terpolymer vinylidene fluoride (65% moles) with hexafluoropropylene (20%) and tetrafluoroethylene (15%).

Polymeric composition AB.30: a mixture of 70 parts by weight of Tecnoflon NM and of 30 parts by weight of AFLAS 150 (R), a copolymer containing equimolecular amounts of tetrafluoroethylene and propylene, produced by Ashahi Glass.

Polymeric composition AB.40: the hereinbefore cited mixture, containing 40% of AFLAS 150.

Polymeric composition AB.20: the hereinbefore cited mixture, containing 20% of AFLAS 150. Other ingredients used for the preparation of the vulcanizable compositions:

triallylisocyanurate (TAIC).

triallylcyanurate (TAC).

benzyl-tris (dimethylaminophosphonium) tetrafluoroborate (BTPBF$_4$).

Luperco 101 XL: 2,5-dimethyl-2,5-di-ter.butylperoxyhexane, in the form of a mixture with an inert filler, with 40% of peroxide.

Tecnocin A: a Schiff base from cinnamic aldehyde and hexamethylendiamine.

The data relating to three compositions according to the invention (tests 2, 3 and 4) for purposes of comparison vulcanizable composition according to the art (tests 1,5 and 6) are recorded on the following Table. The amounts are expressed as parts by weight.

TABLE 1

| TEST No. | 1 | 2 | 3 | 4 | 5 | 6 |
|---|---|---|---|---|---|---|
| TECNOFLON TN | — | — | — | — | 100 | 100 |
| TECNOFLON NM | 100 | — | — | — | — | — |
| COMPOSITION AB.30 | — | 100 | — | — | — | — |
| COMPOSITION AB.40 | — | — | 100 | — | — | — |
| COMPOSITION AB.20 | — | — | — | 100 | — | — |
| TECNOCIN A | — | 3 | 2.5 | 3.5 | — | 3 |
| BISPHENOL AF | 1.8 | — | — | — | 2.4 | — |
| BTPBF$_4$ | 0.4 | — | — | — | 0.6 | — |
| MAGLITE DE (MgO) | 3 | 5 | 5 | 5 | 3 | 15 |
| CALCIUM HYDROXIDE | 6 | — | — | — | 6 | — |
| LUPERCO 101 XL | — | 1.5 | 1.8 | 1.2 | — | — |
| TAC | — | 1.5 | 1.8 | 1.2 | — | — |
| CARBON MT | 20 | 20 | 20 | 20 | — | 20 |
| CARNAUBA WAX | 1 | 1 | 1 | 1 | 1 | 1 |

VULCANIZATION AT 175° C. × 8' in press, then at 200° C. × 24 hours in oven

Starting physical characteristics:

| | 1 | 2 | 3 | 4 | 5 | 6 |
|---|---|---|---|---|---|---|
| Tensile strength N/mm$^2$ | 15 | 16 | 15.5 | 15 | 15.5 | 14 |
| Elongation at break % | 190 | 270 | 230 | 220 | 200 | 200 |
| Hardness Shore A | 73 | 72 | 71 | 73 | 74 | 73 |
| Compression set B % | 25 | 61 | 65 | 58 | 36 | 52 |

TABLE 1-continued

| TEST No. | 1 | 2 | 3 | 4 | 5 | 6 |
|---|---|---|---|---|---|---|
| 150° C. × 22 hours + 3 cooling hours | | | | | | |
| Bondability (Shaft seals moulding at 180° C. × 7') | −16 | −4 | −3 | −6 | −14 | −14 |
| Stability test: towards oils SF = Tested lubricant Shell super-3 15W40 | | | | | | |
| Dipping test ASTM D471 at the indicated temperature for 168 hours | | | | | | |
| Test at 150° C. | | | | | | |
| (a) Tensile strength variation, % | −19 | +2 | +4 | −6 | −8 | −15 |
| (b) Elongation variation at break, % | −10 | +7 | +15 | −8 | −12 | −8 |
| (c) Hardness Shore variation | −1 | −2 | −2 | −1 | −1 | −1 |
| Test at 170° C. | | | | | | |
| (a) Tensile strength variation, % | −34 | +5 | +8 | −10 | −10 | — |
| (b) Elongation variation at break, % | −34 | +2 | +4 | −12 | −13 | — |
| (c) Hardness Shore variation | −2 | −2 | −2 | −2 | −2 | — |
| Test at 200° C. | | | | | | |
| (a) Tensile strength variation, % | −54 | −8 | −8 | −20 | −25 | — |
| (b) Elongation variation at break, % | −34 | −6 | −5 | −19 | −20 | — |
| (c) Hardness Shore variation | −2 | −2 | −2 | −2 | −2 | — |
| Surface appearance: | | | rough | smooth | smooth | rough |

TABLE 2

| STEAM RESISTANCE | (1) | (2) |
|---|---|---|
| TECNOFLON NM | — | 100 |
| COMPOSITION AB.30 | 100 | — |
| Pb O | 10 | 10 |
| BLACK MT | 25 | 25 |
| LUPERCO 101 XL | 1.5 | — |
| TAIC | 1.5 | — |
| CARNAUBA WAX | 1 | 1 |
| BISPHENOL AF | — | 2 |
| BTPBF$_4$ (GM 104) | — | 0.5 |
| TECNOCIN A | 2.5 | — |

Vulcanization: in press at 170° C. for 8', in oven at 200° C. for 24 hours
Physical characteristics:
product as such (1)
(a) tensile strength Kg/cm$^2$    140
(b) elongation %    250
(c) hardness    71
(2) After treatment in water at 160° C. for 7 days:
(a) = 110
(b) = 290
(c) = 68
(d) Volume variation + 2.5%
(2) as such
a = 160
b = 180
c = 73
H$_2$O 160° × 7 days
a = 120
b = 165
c = 65
volume variation + 10%

What we claim is:
1. Composition of elastomers suitable to be vulcanized, comprising:
(a) a fluoroelastomer based on vinylidene fluoride (40–83% by moles), perfluoropropene (15%–35%) and tetrafluoroethylene (0%–30%), in an amount equal to 42%–70% by weight of the total elastomeric composition;
(b) an amino compound suitable for vulcanizing fluoroelastomers selected from the group comprising the Schiff bases or the diamine carbamates, in an amount equal to 1–4% by weight of the total composition;
(c) a copolymer of tetrafluoroethylene (40%–60% by moles) and of propylene (60%–40%) in an amount equal to 51–22% by weight of the whole;
(d) an organic peroxide as vulcanizing agent, in an amount equal to 0.4–5% by weight of the whole.

* * * * *